C. E. WILLIAMS.
FLOATING DIE HOLDER.
APPLICATION FILED OCT. 6, 1916.

1,220,149.

Patented Mar. 20, 1917.
2 SHEETS—SHEET 1.

INVENTOR:
Charles E. Williams
by Macleod, Calver, Copeland & Dike
Attys.

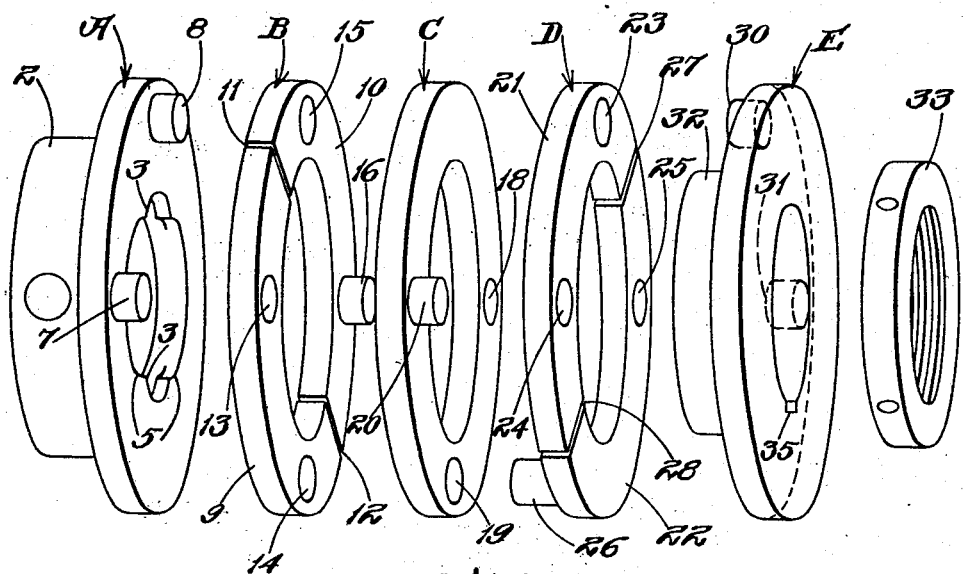

UNITED STATES PATENT OFFICE.

CHARLES E. WILLIAMS, OF MANSFIELD, MASSACHUSETTS, ASSIGNOR TO BAY STATE TAP & DIE COMPANY, OF MANSFIELD, MASSACHUSETTS, A CORPORATION OF MASSACHUSETTS.

FLOATING DIE-HOLDER.

1,220,149.  Specification of Letters Patent.  Patented Mar. 20, 1917.

Application filed October 6, 1916. Serial No. 124,013.

*To all whom it may concern:*

Be it known that I, CHARLES E. WILLIAMS, a citizen of the United States, residing at Mansfield, county of Bristol, State of Massachusetts, have invented a certain new and useful Improvement in Floating Die-Holders, of which the following is a specification, reference being had therein to the accompanying drawings.

The invention relates to an improvement in die holders, that is, the holder of a die which is used in the cutting of screw threads upon a rod. As is well known to those skilled in the art, it is absolutely necessary that the die and the rod on which the thread is to be cut should be exactly centered with relation to each other. The axis of the rotary shaft on which the die holder is mounted is fixed during the operation. It is usual to feed the die to the rod. The holder for the rod and the mount for the die holder shaft should be set up so that the axis of the rod, if straight, and the axis of the die are in exact alinement with each other, but owing to the fact that the rod sometimes has a very slight bend, the die sometimes will not feed into exact alinement with the rod if the die holder has no capacity for automatic adjustment or compensation. It would take altogether too much time to be obliged to make re-adjustment of the die holder by hand every time a rod happens to be introduced into the machine which is slightly out of alinement and it, therefore, becomes necessary to provide an automatic adjustment. In many machine shops the rod has several operations performed upon it in the same machine and in order for greater efficiency the tools are arranged in gangs so that several rods can be operated upon at the same time; for instance, if there are four operations, four rods are mounted in one head and are disposed 90° apart from each other, the rods all being parallel with each other, and the gang of tools which are to operate upon them being also disposed at 90° apart from each other.

The rods are all acted upon at one time, so that number 1 rod will be acted upon by number 1 tool, number 2 rod by number 2 tool, and number 3 rod by number 3 tool, and number 4 rod by number 4 tool. If the thread cutting die is the one to perform the second operation, then after each one of the rods has been operated upon by one of the tools, the rod holder will make a one-quarter turn so that number 2 rod will then be brought into alinement with the die, and the previous rod which is number 2 will have been moved around to be operated upon by number 3 tool, and number 3 rod will be in position for number 4 tool and so on.

The rod will practically never be much out of alinement with the die but even a slight variation is serious and has to be corrected. A floating die holder so called is sometimes employed which, if the end of the rod comes in contact with the chamfered end of the die a little off-center is intended to cause the die and die holder to move slightly in a lateral direction until the die is centered with the rod. My invention relates to an improvement in die holders of this class. The die holder should be easily and quickly movable in any direction in a plane at right angles to the axis of the die shaft. So far as known to me floating die holders as heretofore constructed do not have a proper responsive movement and even if the die has a loose floating movement so that it approaches alinement with the rod, yet if the axis of the die shaft is not centered with the rod, the cutting strain will prevent the die from coming fully into alinement. The object of my invention is to make a floating die holder which does have a quickly responsive adjustability in any direction in a plane at right angles to the axis of the die and to allow the die to follow the rod while under cutting strain even though the driving spindle is out of alinement.

The invention will be fully understood when taken in connection with the accompanying drawings and the novel features thereof will be pointed out and clearly described in the claims at the close of this specification.

In the drawings Figure 1 is a plan view of a die holder and shaft embodying the invention.

Fig. 4 is a detail perspective view of the several parts of the die holder separated from each other but in proper relation to each other for assembling.

Fig. 5 is a detail view of the die holder shaft.

Fig. 6 is a section on line 6—6 of Figs. 1 and 3 showing the arcuate members of the forward two part ring in eccentric relation to the shaft and to each other, the rear two part ring being left concentric with the shaft.

Fig. 7 is a section on line 6—6 of Figs. 1 and 3 showing the arcuate members of the rear two part ring in eccentric relation to the shaft and to each other, the members of the forward two part ring being eccentric to each other but concentric to each other.

Figure 1:
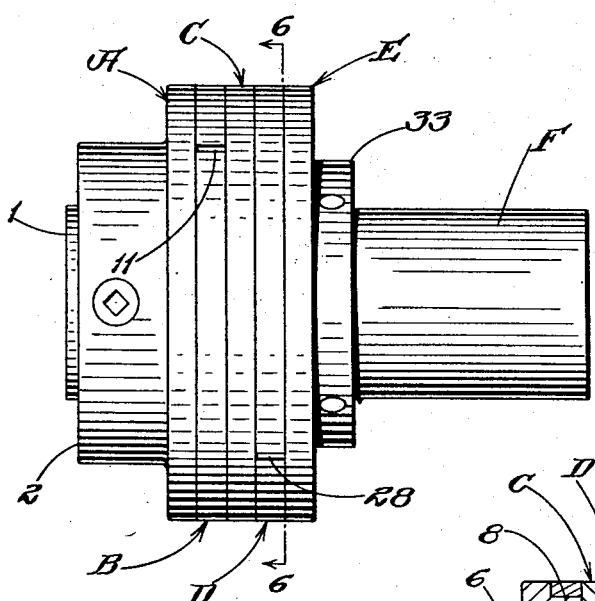
Figure 3:
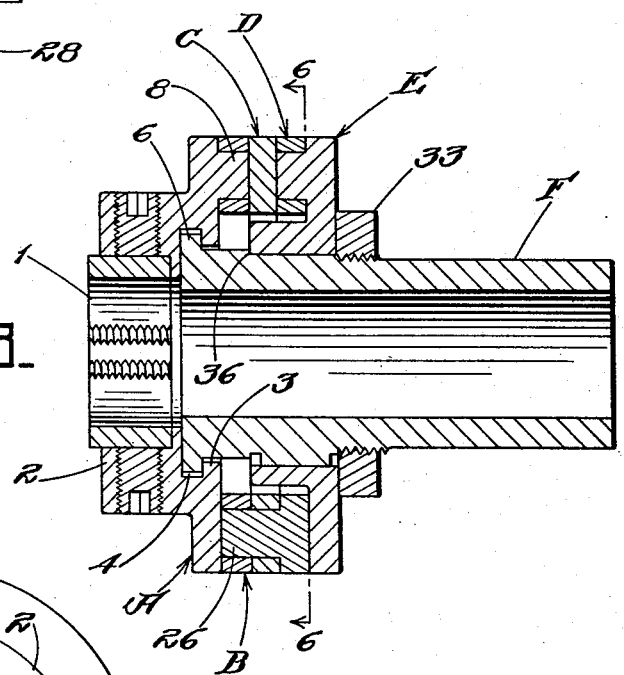
Fig. 3 is a longitudinal sectional view of the device shown in Fig. 1.

The floating movement is accomplished by means of a plurality of rings strung on the die holder shaft some of which are two part and some are whole, said rings having a pin and hole connection with each other, the two part rings being each composed of arcuate members, the members which go to make up each two part ring forming slightly less than a full circle, the breaks in each ring being out of alinement with the breaks in the other ring and the two part rings being preferably separated from each other by one of the whole rings. The axis of the shaft is fixed and the rear end ring is always concentric with the shaft. The forward end ring which carries the die is normally concentric with the shaft but is capable of movement into eccentric relation to the shaft in any radial direction.

If the holder is composed of three whole rings and two broken rings, as shown in the drawings, each broken or two part ring is composed of two arcuate members, each slightly less than a half circle, and the splits in one two part ring are at 90° from the splits in the other two part ring.

Referring now to the drawings, the die 1 is rigidly mounted in a head 2, said head 2 having formed integral therewith or fixedly secured thereto an annular member A which is under-cut in its periphery to form a grooved way 4, the flange 3 which forms the inner periphery of the groove being cut back in two places to form the two opposite notches 5—5 to admit the two flange tongues 6, 6 of the shaft F. In connecting the shaft F with the head, the tongues 6, 6 will be introduced into the cut out portions 5, 5 then by giving a quarter turn to the shaft the tongues 6, 6 will be carried around into the under cut groove 4.

The diameter of the inner periphery of the flange 3 is shorter than the diameter of the shaft F, and the exterior diameter of the flange tongues 6, 6 is shorter than the diameter of the groove 4, so that when the tongues 6, 6 are engaged in the groove 4 the head ring A is loose enough on the shaft to permit it to move from concentric to eccentric relation to the shaft F.

For convenience in description, the sides of all of the rings which face toward the die will be referred to as the front faces, and the opposite sides will be referred to as the rear faces.

Two pins 7, 8 project rearwardly from the face of the annular member A at right angles to said face.

Two arcuate members 9, 10 each less than a half circle and placed end to end form together a two part ring B cut cross-wise in two places 11, 12. The member 9 is formed with two perforations 13, 14 and the member 10 is formed with a perforation 15 and has a pin 16 projecting from the rear face at right angles to its plane. The two members 9, 10 may be assembled with the ring member A by passing the pin 7 through the aperture 13 and passing the pin 8 through the aperture 15 with which the pins loosely fit. The pins 7, 8 are the same length as the thickness of the arcuate semi-ring members 9, 10 and therefore the only projection from the rear face of either member of the ring B will be the pin 16 which engages with a hole 18 in the ring C. When thus assembled, the semi-ring members 9, 10 being made on the same curve as the ring member A, there will be a slight space between the adjacent ends of the two semi-ring members as indicated by the numerals 11, 12.

Each arcuate member has a slight swiveling movement on the pin with which it is engaged.

A continuous, closed ring C is formed with two apertures 18, 19. It is adapted to be assembled with the arcuate ring members 9, 10 by passing the pin 16 of the member 10 through the aperture 18. It is also formed with a pin 20 projecting from the rear face thereof.

Another two part ring D is formed by the two arcuate members 21, 22, the two members together forming a little less than a complete circle open in two places. The member 21 is formed with two apertures 23, 24 and the member 22 is formed with an aperture 25 and with a pin 26 which projects from the front face, that is from that face of the ring which is toward the rings previously described and extends toward the front end, while the pins previously mentioned all extend toward the rear. These two semi-ring members 21, 22 may be assembled with the ring C by passing the pin 20 loosely through the aperture 24, said pin 20 being of no greater length than the thickness of the semi-ring member 21 so that it will not extend beyond the opposite surface of said ring member. The pin 26 is twice as long as the other pins, that is long enough to pass through the aperture 19 in the ring C and also into the aperture 14 in the semi-ring member 9, said apertures 14 and 19 being so located that they will be in alinement with each other when the parts are assembled. There will be a thin space left between the adjacent ends of the two semi-ring members 21, 22 as indicated by 27, 28 because as already stated the semi-ring members 21, 22 form together a little less than a circle. These breaks or spaces 27, 28 are 90° from the spaces 11, 12.

Another entire ring member E is provided with two pins 30, 31 which project from its front face toward the semi-ring members 21, 22 and are so spaced and located that the said pins 30, 31 engage respectively with the apertures 23, 25 in the two semi-ring members 21, 22 said pins not being long enough to extend beyond the opposite face of said members. Said ring E is formed with a hub 32 which when the several rings are assembled is preferably of sufficient length to extend through the central opening formed in the two part ring D and the whole ring C.

The shaft F is of sufficient length so that after the head ring A has been mounted upon the said shaft and the other rings already described have been assembled together and upon said shaft, the shaft will project at some distance to the rear. It is formed with a screw thread onto which a ring nut 33 is screwed to hold the ring E up against the shoulder 36 on the shaft F. The other rings all float on the shaft.

When thus assembled, the pins 7, 8 of ring A will pass loosely through the apertures 13, 15 respectively of the semi-ring members 9, 10 of ring B, but not beyond the rear surface, so that there is a smooth contact surface for the whole ring C. The ring C will be engaged with the ring B by the pin 16 passing loosely through the hole 18 as already described, the face of said ring C thus having a smooth contact surface for the ring D, said two rings C, D being connected together by the pin 20 passing through the pin hole 24 and by the pin 26 passing through the pin holes 19, 14 respectively of the rings C, B. The ring D has a smooth engaging surface for the contacting face of the ring E which is connected to the ring D by the pins 30, 31 engaging the pin holes 23, 25 in the two semi-ring members 21, 22 as already described.

Each semi-ring member has a pin and hole connection with the whole ring member on each side of it, but the connections on the two opposite sides are 90° from each other.

When thus assembled the rear ring E is fixed to the shaft, but there is a slight eccentric play of each one of the outer whole rings and two part rings with relation to the shaft, and an eccentric play of each semi-ring with relation to its companion semi-ring. The assembled rings altogether make up the die holder of my invention. The peculiar effect of this construction and combination is to permit an automatic adjustability of the die holder and die in any direction in a plane at right angles to the axis of the shaft within a limited range sufficient to compensate for any ordinary lack of alinement of the rod on which the thread is to be cut.

The shaft F is formed with a key 34, and the rear ring E is formed with a longitudinal key way 35 in its inner periphery with which said key engages to prevent rotation of the said ring E with relation to the shaft.

Figure 2:
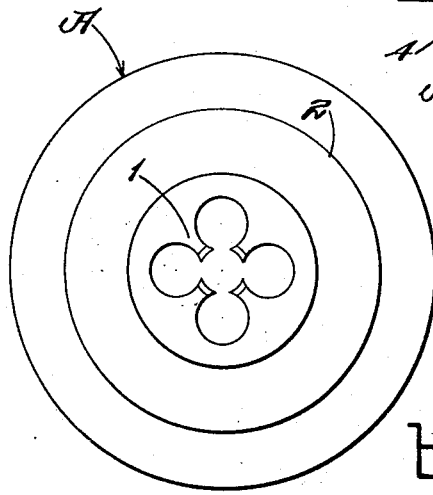
Fig. 2 is an end view of the device shown in Fig. 1.

Assume the parts to be in their normal position as shown in Fig. 1, that is, to operate to cut threads on a rod whose axis is in alinement with the axis of the die. Now if the axis of the rod to be operated on is out of alinement with the axis of the die the operation of the device will be as follows:

First, suppose the rod which is to be threaded is slightly out of alinement in a vertical direction, after the die has been advanced to the rod, the die on account of its chamfer as shown in Fig. 2 will accommodate itself to this slight amount which we have assumed that the rod is out. This movement of the die is effected through its connection with the first pair of arcuate members and the position of these members after this movement is shown in Fig. 6.

Now suppose that the rod to be threaded is slightly out on the horizontal, then the movement of the die is in a horizontal direction to accommodate itself to the amount the rod is out in this direction, and is effected through its connection with the second pair of arcuate members and the position of these members is shown in Fig. 7.

Assuming that the die holder is set so that the ends of the arcuate members 9, 10 are in a horizontal plane and the ends of the members 21, 22 are in a vertical plane, if the movement of the die is in a vertical direction, that is at right angles to the plane of the ends of members 9, 10 of the ring B, the members 9, 10 will swivel slightly in opposite directions on one of the pins with which they are respectively engaged, so that they become eccentric to each other and to the axis of the shaft, the ring C and the arcuate members of the two part ring D being unchanged in position, and remaining concentric with the shaft. When the movement of the die is in a horizontal direction, that is, in a plane at right angles to the plane of the ends of the arcuate members 21, 22, said members 21, 22 will swivel slightly in opposite directions to each other on one of the pins with which they are respectively engaged, so that they become eccentric to each other and to the axis of the shaft, the arcuate members 9, 10 of ring B being left eccentric with each other but they and the whole ring C will all move eccentric with the shaft. If the movement of the die is in a plane between the vertical and horizontal, the arcuate members of both two part rings, B, D, will move slightly to give the necessary compensation.

When the float is obtained by means of slides such as are sometimes used, if the adjustment has to be made while the die is rotating, the action is tardy and the die is again thrown out of alinement, while with my invention, the response is quick and insures accurate alinement.

What I claim is:

1. A floating die holder composed of a plurality of annular members placed together in a normally concentric relation, some of said annular members being whole rings and others being broken rings formed of arcuate members placed end to end with narrow spaces between the adjacent ends, each of said rings having a loose pin and hole connection with the adjacent rings, constructed and arranged to permit a slight eccentric movement of said members with relation to each other.

2. A floating die holder composed of a plurality of annular members mounted upon shaft and successively contacting with each other, some of said annular members being whole rings and others being two part rings formed of arcuate members placed end to end, said two part rings alternating with the said whole rings, one of the whole rings being at each end of the series, each of said rings having a pivot connection with the adjacent rings, and means for preventing said rings from longitudinal movement on the shaft, each member of said two part rings having a floating movement in a plane parallel with the planes of the other rings.

3. A floating die holder composed of a plurality of annular members mounted upon a shaft and successively contacting with each other, some of said annular members being whole rings and others being two part rings formed of arcuate members placed end to end with narrow spaces between the adjacent ends, said two part rings alternating with the said whole rings, one of the whole rings being at each end of the series, each of said rings having a pivot connection with the adjacent rings arranged to permit movement of the head ring in a plane at right angles with the axis of the shaft.

4. A floating die holder composed of a plurality of annular members mounted upon a shaft and successively contacting with each other, some of said annular members being whole rings and others being two part rings formed of arcuate members placed end to end with narrow spaces between the adjacent ends, said two part rings alternating with the said whole rings, one of the whole rings being at each end of the series, each of said rings having a pin and hole connection with the adjacent rings parallel with the axis of the shaft.

5. A floating die holder composed of at least five annular members mounted upon a shaft and successively contacting with each other, the two end rings and the middle ring being whole rings, the second and fourth annular members being each a two part ring composed of semi-circular members placed with their ends toward each other with a slight gap between them, the combined length of each pair of semi-circular members being slightly less than a full circle, the head member of said series containing the die and having two pins projecting at some distance apart from each other from the rear face thereof, the semi-circular members of the second ring each being formed with a pin hole with which respectively said pins of the first member loosely engage, one of said semi-circular members of the second ring being formed with a rearwardly extending pin, the third ring of said series being formed with a pin hole which loosely engages with said pin of the second ring, the said third ring having a rearwardly projecting pin, the fourth ring of the series, which is the second two part ring, having one of its members formed with a pin hole which is loosely engaged by the rearwardly projecting pin of said third ring, the other member of said last mentioned two part ring being formed with a forwardly extending pin, said third ring and that member of the said second two part ring which does not have the previously mentioned pin being formed with a pin hole in alinement with the last mentioned pin hole of the third ring, said forwardly projecting pin of the fourth ring loosely engaging with said alined holes of both the second and third ring, the fifth ring of the series being formed with two rearwardly projecting pins, the two members of said fourth ring being each formed with a pin hole with which said pins of the fifth ring loosely engage.

6. A floating die holder composed of a plurality of annular members mounted upon a shaft and successively contacting with each other, some of said annular members being whole rings and others being two part rings formed of arcuate members placed end to end with narrow spaces between the adjacent ends, said two part rings alternating with the said whole rings, one of the whole rings being at each end of the series, each of said rings having a pivot connection with the adjacent rings, one of the members of each two part ring having the pivot connection with the whole ring on one side and the other member of said two part ring having the pivot connection with the whole ring at the other side thereof.

7. A floating die holder composed of a plurality of annular members mounted upon a shaft and successively contacting with each other, some of said annular members being whole rings and others being two-part rings formed of arcuate members placed end to end with narrow spaces between the adjacent ends, said two-part rings alternating with the said whole rings, one of the said whole rings being at each end of the series, each of said rings having a loose pin and slot connection with the adjacent arcuate members, the head ring of the series containing a die, the rear ring of the series being made fast to the shaft, the other rings and arcuate members being movable with relation to each other and to the shaft in a plane at right angles with the axis of the shaft.

8. A floating die holder composed of a plurality of annular members mounted upon a shaft and successively contacting with each other, some of said annular members being whole rings and others being two-part rings formed of arcuate members placed end to end with narrow spaces between the adjacent ends, said two-part rings alternating with the said whole rings, one of the said whole rings being at each end of the series, each of said rings having a loose pin and slot connection with the adjacent arcuate members, the head ring of the series containing a die, the rear ring of the series being made fast to the shaft, the other rings and arcuate members being movable with relation to each other and to the shaft in a plane at right angles with the axis of the shaft, the spaces between the ends of the arcuate members of one two-part ring being out of alinement with the spaces between the ends of the arcuate members of the other two part ring.

In testimony whereof I affix my signature, in presence of two witnesses.

CHARLES E. WILLIAMS.

Witnesses:
 WILLIAM A. COPELAND,
 LUCY F. COPELAND.

Copies of this patent may be obtained for five cents each, by addressing the "Commissioner of Patents, Washington, D. C."